United States Patent
Sakamoto et al.

(10) Patent No.: US 9,475,969 B2
(45) Date of Patent: Oct. 25, 2016

(54) ORGANOPOLYSILOXANE COMPOUND HAVING ETHYNYL GROUPS, METHOD FOR PREPARING LINEAR ORGANOPOLYSILOXANE COMPOUND HAVING ETHYNYL GROUPS AT BOTH TERMINALS OF MOLECULAR CHAIN, METHOD FOR PREPARING ORGANOPOLYSILOXANE POLYMER HAVING ALKOXYSILYL-ETHYLENE GROUP AT TERMINAL, ROOM TEMPERATURE CURABLE COMPOSITION AND MOLDED PRODUCT WHICH IS CURED PRODUCT THEREOF

(71) Applicant: SHIN-ETSU CHEMICAL CO., LTD., Tokyo (JP)

(72) Inventors: Takafumi Sakamoto, Annaka (JP); Takahiro Yamaguchi, Annaka (JP); Tetsuro Yamada, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/649,788

(22) PCT Filed: Dec. 10, 2013

(86) PCT No.: PCT/JP2013/007246
§ 371 (c)(1),
(2) Date: Jun. 4, 2015

(87) PCT Pub. No.: WO2014/097573
PCT Pub. Date: Jun. 26, 2014

(65) Prior Publication Data
US 2015/0315428 A1    Nov. 5, 2015

(30) Foreign Application Priority Data

Dec. 20, 2012  (JP) .................. 2012-277861
Dec. 20, 2012  (JP) .................. 2012-277862
Dec. 20, 2012  (JP) .................. 2012-277863

(51) Int. Cl.
| | | |
|---|---|---|
| C09J 149/00 | (2006.01) |
| C08F 238/00 | (2006.01) |
| C09D 149/00 | (2006.01) |
| C09D 183/14 | (2006.01) |
| C08G 77/10 | (2006.01) |
| C08G 77/20 | (2006.01) |
| C08G 77/50 | (2006.01) |
| C09K 3/10 | (2006.01) |
| C08L 83/14 | (2006.01) |
| C09J 183/14 | (2006.01) |

(52) U.S. Cl.
CPC .......... *C09J 149/00* (2013.01); *C08F 238/00* (2013.01); *C08G 77/10* (2013.01); *C08G 77/20* (2013.01); *C08G 77/50* (2013.01); *C08L 83/14* (2013.01); *C09D 149/00* (2013.01); *C09D 183/14* (2013.01); *C09K 3/1018* (2013.01); *C09J 183/14* (2013.01)

(58) Field of Classification Search
None
See application file for complete search history.

(56) References Cited

U.S. PATENT DOCUMENTS

| | | | |
|---|---|---|---|
| 5,081,199 A | 1/1992 | Okinoshima | |
| 5,096,990 A * | 3/1992 | Takayanagi | C08L 83/04 525/478 |
| 5,231,158 A | 7/1993 | Lewis et al. | |
| 5,329,036 A * | 7/1994 | Dougherty | C07F 7/0836 528/32 |
| 5,489,662 A * | 2/1996 | Wakamatsu | C08G 77/60 528/14 |
| 6,013,711 A * | 1/2000 | Lewis | A61K 6/083 524/265 |
| 6,271,280 B1 * | 8/2001 | Boileau | C08F 290/148 522/99 |
| 8,247,515 B2 * | 8/2012 | Kennedy | C08L 33/26 525/100 |
| 2002/0082339 A1 * | 6/2002 | Zhou | C09D 11/03 524/588 |
| 2002/0147275 A1 * | 10/2002 | Bublewitz | A61K 6/10 525/100 |
| 2002/0156186 A1 | 10/2002 | Bublewitz et al. | |
| 2004/0116566 A1 | 6/2004 | Fehn | |

(Continued)

FOREIGN PATENT DOCUMENTS

| | | |
|---|---|---|
| EP | 2 998 287 A1 | 3/2016 |
| JP | S3927643 B | 12/1964 |

(Continued)

OTHER PUBLICATIONS

Mar. 25, 2014 International Search Report issued in Application No. PCT/JP2013/007246.

(Continued)

*Primary Examiner* — Robert S Loewe
(74) *Attorney, Agent, or Firm* — Oliff PLC

(57) ABSTRACT

The present invention relates to an organopolysiloxane compound which is either a linear or a branched, and having at least one unit of the following formula (1) as a partial structure, and according to this compound, a novel polyorganosiloxane compound having an ethynyl group, and a method for preparing a linear organopolysiloxane compound having ethynyl groups at both terminals of a molecular chain which can easily adjust a polymerization degree, and excellent in productivity can be provided.

(1)

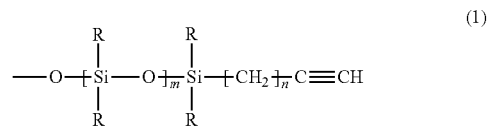

13 Claims, No Drawings

(56) References Cited

U.S. PATENT DOCUMENTS

| | | | | |
|---|---|---|---|---|
| 2005/0239958 A1* | 10/2005 | Bublewitz | ............... | A61K 6/10 524/862 |
| 2007/0289495 A1 | 12/2007 | Cray et al. | | |
| 2009/0192282 A1* | 7/2009 | Janvikul | ............... | C08G 77/14 528/34 |
| 2010/0029888 A1 | 2/2010 | Ritter et al. | | |
| 2011/0257324 A1 | 10/2011 | Ziche et al. | | |
| 2013/0059109 A1 | 3/2013 | Kretschmann et al. | | |

FOREIGN PATENT DOCUMENTS

| | | |
|---|---|---|
| JP | S5543119 A | 3/1980 |
| JP | S56122390 A | 9/1981 |
| JP | H04-283266 A | 10/1992 |
| JP | H4283589 A | 10/1992 |
| JP | H06-248084 A | 9/1994 |
| JP | H07-39547 B2 | 5/1995 |
| JP | H07-331076 A | 12/1995 |
| JP | H08-151447 A | 6/1996 |
| JP | H10-110037 A | 4/1998 |
| JP | 2002-020491 A | 1/2002 |
| JP | 2004-189744 A | 7/2004 |
| JP | 2008-520804 A | 6/2008 |
| JP | 2010-037561 A | 2/2010 |
| JP | 2012-511607 A | 5/2012 |
| WO | 2011-107592 A1 | 9/2011 |

OTHER PUBLICATIONS

Suzuki et al. "Synthesis and Properties of Silethynylene-Siloxane Altering of Copolymers," European Polymer Journal, vol. 28, No. 11, pp. 294-295, pp. 1373-1376, 1992.

Jun. 23, 2015 International Preliminary Report on Patentability issued in International Application No. PCT/JP2013/007246.

Dec. 22, 2015 Office Action issued in Japanese Patent Application No. 2014-552910.

Jun. 21, 2016 extended European Search Report issued in Application No. 13864315.0.

* cited by examiner

ORGANOPOLYSILOXANE COMPOUND HAVING ETHYNYL GROUPS, METHOD FOR PREPARING LINEAR ORGANOPOLYSILOXANE COMPOUND HAVING ETHYNYL GROUPS AT BOTH TERMINALS OF MOLECULAR CHAIN, METHOD FOR PREPARING ORGANOPOLYSILOXANE POLYMER HAVING ALKOXYSILYL-ETHYLENE GROUP AT TERMINAL, ROOM TEMPERATURE CURABLE COMPOSITION AND MOLDED PRODUCT WHICH IS CURED PRODUCT THEREOF

TECHNICAL FIELD

The present invention relates to a novel organopolysiloxane compound having an ethynyl group, a method for preparing a linear organopolysiloxane compound having ethynyl groups at both terminals of a molecular chain, a method for preparing an organosiloxane polymer having an alkoxysilyl-ethylene group at its terminal, a room temperature curable composition and a molded product obtained by curing the same.

BACKGROUND ART

An organopolysiloxane compound having an unsaturated hydrocarbon onto the terminal silicon is useful as a base polymer of an addition curable silicone composition. The addition curable silicone composition forms a silicone gel or a silicone rubber each excellent in electric characteristics, cold resistance, etc., after curing, so that it has been utilized as a sealing agent, a filler or a coating agent of electric and electronic parts or a semiconductor device, and a photo-semiconductor insulation-coating protective material, etc.

As a silicon compound having ethynyl groups at the both terminals, a low molecular weight monomer such as a low molecular weight silicon compound having ethynyl groups at the terminals, 1,3-diethynyl-1,1,3,3-tetramethyldisiloxane (CAS Registry Number: 4180-02-3), 1,5-diethynyl-1,1,3,3,5,5-hexamethyltrisiloxane (CAS Registry Number: 39490-70-5), 1,7-diethynyl-1,1,3,3,5,5,7,7-octamethyltetrasiloxane (CAS Registry Number: 40392-68-5), 1,9-diethynyl-1,1,3,3,5,5,7,7,9,9-decamethylpentasiloxane (CAS Registry Number: 40392-69-6) and 1,11-diethynyl-1,1,3,3,5,5,7,7,9,9,11,11-dodecamethylhexasiloxane (CAS Registry Number: 40392-70-9), etc., have been described, and there is disclosed a method for preparing an organopolysiloxane compound having an acetylene portion at the main chain which comprises subjecting these silicon compounds and a divalent halogenated arylene compound to polycondensation reaction in the presence of a transition metal catalyst (Patent Literatures 1 and 2). It has also been reported about a synthetic example of an acetylene-containing high molecular weight silicon compound (Non-Patent Literature 1).

However, the organopolysiloxane compound which is either a linear or a branched, and having at least one unit of the following formula (a) as a partial structure is limited to an organopolysiloxane compound where N=0 and M=0 to 20 in the following formula (a), and there is no reported example about an organopolysiloxane compound having a higher polymerization degree and having an ethynyl group at its polymer terminal.

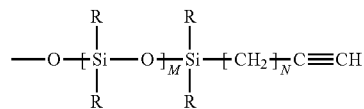

(a)

Also, an organopolysiloxane compound having terminal ethynyl groups represented by the following formula (b) is limited only to an organopolysiloxane compound wherein N=0 and M=0 to 20 in the following formula (b), and it has not been reported about a method for preparing an organopolysiloxane compound having ethynyl groups at the polymer terminals with a higher polymerization degree.

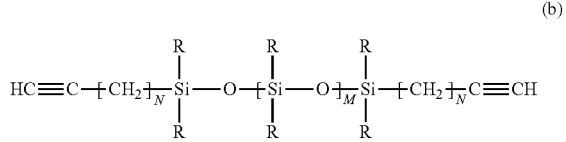

(b)

For example, when an organopolysiloxane compound having an ethynyl group at its terminal is to be synthesized by an alkali equilibration, an alkali metal forms a metal acetylide such as C-M (M is an alkali metal) by substituting with H of the C—H bond at the acetylene portion, so that it is difficult to synthesize an organopolysiloxane compound having an ethynyl group at its terminal having a higher polymerization degree.

Also, a room temperature curable composition which cures to an elastomer state at a room temperature by contacting with a moisture in the air has conventionally been known various types of materials, and above all, a material of the type which cures by discharging an alcohol is preferably used for sealing, adhesion or coating of an electric and electronic devices, etc., due to its characteristics that there is no unpleasant smell and it does not corrode metals.

Representative examples of such a type may be mentioned those disclosed in Patent Literature 3, and a composition comprising an organopolysiloxane the terminal of which has been blocked by a hydroxyl group, an alkoxysilane and an organotitanium compound has been disclosed therein. Also, in Patent Literature 4, there is disclosed a composition comprising an organopolysiloxane the terminal of which has been blocked by an alkoxysilyl, an alkoxysilane and an alkoxytitanium. In Patent Literature 5, there is disclosed a composition comprising a linear organopolysiloxane having an alkoxysilyl-ethane group, an alkoxysilane and an alkoxytitanium. Further, in Patent Literature 6, there is disclosed a composition comprising an organopolysiloxane the terminal of which has been blocked by a hydroxyl group or an organopolysiloxane the terminal of which has been blocked by an alkoxy group, and an alkoxy-α-silyl ester compound.

These compositions gave good characteristics in storage stability and durability (water resistance and humidity resistance), but they were insufficient with regard to rapid curability.

An organosiloxane polymer having a reactive alkoxysilyl group at its terminal has conventionally been known. The terminal group of the organosiloxane polymer has previously been blocked by an alkoxysilyl group so that curability of the polymer difficulty change (lower) with a lapse of time, and a composition excellent in storage stability can be obtained. Also, workability (viscosity and thixotropic property) thereof can be optionally adjustable, and it reacts with a moisture in the air to form an elastomer by crosslinking, whereby excellent characteristics (hardness, tensile strength and elongation at break) can be also obtained.

However, a dealcoholation type room temperature curable organopolysiloxane composition comprising an organosiloxane polymer having such a reactive alkoxysilyl group at its terminal as a main agent (a base polymer) was insufficient in curability as compared to the other' conventionally known curing types such as a deoximation type, a deacetylation type, a deacetone type, etc., since reactivity with a moisture in the air is low.

As a measure thereof, researches focused on a functional group (a bonding group) adjacent to the reactive alkoxy group have been promoted, and it has been reported that an α-alkoxysilylmethyl terminal group has particularly high reactivity with a moisture in the air (Patent Literature 7). However, curability thereof is yet insufficient, and there are defects that the adjacent functional group (bonding group) exerts bad effect to durability, and a restoring force of the cured product is low.

CITATION LIST

Patent Literature

PATENT LITERATURE 1: JP Hei. 8-151447A
PATENT LITERATURE 2: JP Hei. 10-110037A
PATENT LITERATURE 3: JP Sho. 39-27643B
PATENT LITERATURE 4: JP Sho. 55-43119A
PATENT LITERATURE 5: JP Hei. 7-39547B
PATENT LITERATURE 6: JP Hei. 7-331076A
PATENT LITERATURE 7: JP 2012-511607A

Non-Patent Literature

NON-PATENT LITERATURE 1: Eur. Polym. J. 28, 1373 (1992)

SUMMARY OF THE INVENTION

Technical Problem

The present invention has been done in view of the circumstances, and an object thereof is to provide a novel ethynyl group-containing polyorganosiloxane compound, and a method for producing a linear organopolysiloxane compound having ethynyl groups at both terminals of a molecular chain in which adjustment of the polymerization degree can be done easily and its productivity is excellent.

Another object of the present invention is to provide a room temperature curable composition, in particular a room temperature curable organopolysiloxane composition, which provides a cured product particularly excellent in rapid curability, and excellent in storage stability and durability, and a method for producing an organosiloxane polymer having an alkoxysilyl-ethylene group at its terminal which is used as a main agent (a base polymer) of these room temperature curable compositions.

Solution to Problem

The present invention has been done to solve the problems and is to provide an organopolysiloxane compound which is either of a linear or a branched structure (a branched chain), which comprises at least one unit represented by the following formula (1) as a partial structure,

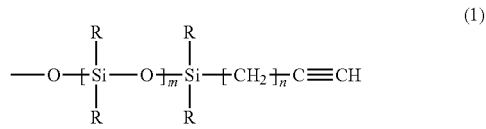

wherein R represents a hydrogen atom or a monovalent hydrocarbon group having 1 to 20 carbon atoms which may have a substituent; each R may be the same or different from each other; "m" represents an integer of 21 to 2,000, parts of a repeating unit of the siloxane bond may be crosslinked to form a branched chain structure; and "n" represents an integer of 0 to 20.

When such an organopolysiloxane compound is employed, it has high hydrosilylation reactivity with a silicon compound having an Si—H bond, and can be expected to be used as a nonvolatile controller.

Also, the present invention is to provide a method for preparing a linear organopolysiloxane compound having ethynyl groups at both terminals of a molecular chain, which comprises preparing a linear organopolysiloxane compound having ethynyl groups at both terminals of a molecular chain represented by the following formula (2), by subjecting a compound represented by the following formula (3) and a compound represented by the following general formula (4) to an equilibration reaction in the presence of an acidic catalyst,

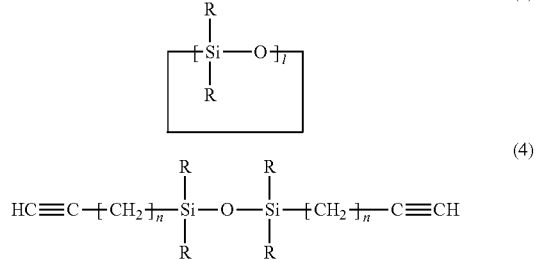

wherein R represents a hydrogen atom or a monovalent hydrocarbon group having 1 to 20 carbon atoms which may have a substituent; each R may be the same or different from each other; "l" represents an integer of 3 to 20; "m" represents an integer of 21 to 2,000, parts of a repeating unit of the siloxane bond may be crosslinked to form a branched chain structure; and "n" represents an integer of 0 to 20, When such a method for preparing a linear organopolysiloxane compound having ethynyl groups at the both terminals of the molecular chain is employed, the compound of the formula (2) can be prepared, and yet, by adjusting the molar ratio of the compound represented by the formula (3) and the compound represented by the formula (4), adjustment of the polymerization degree (m) is easy and it is also excellent in productivity.

Also, in this case, the acidic catalyst is preferably sulfuric acid or trifluoromethanesulfonic acid.

When such an acidic catalyst is employed, it is preferred since the equilibration reaction can be carried out at a relatively low temperature.

Also, the present invention is to provide a method for preparing an organosiloxane polymer having an alkoxysilyl-ethylene group at its terminal which comprises subjecting an organopolysiloxane compound which is either a linear or a branched (branched chain), and having at least one unit of the following formula (1') as a partial structure, and an alkoxysilane having one hydrogen atom bonded to a silicon atom (that is, a hydrosilyl group represented by SiH) in the molecule to addition reaction according to the following reaction scheme, to prepare an organosiloxane polymer which is either a linear or a branched, and having an alkoxysilyl-ethylene group at its terminal having at least one unit of the following formula (1") in the molecule,

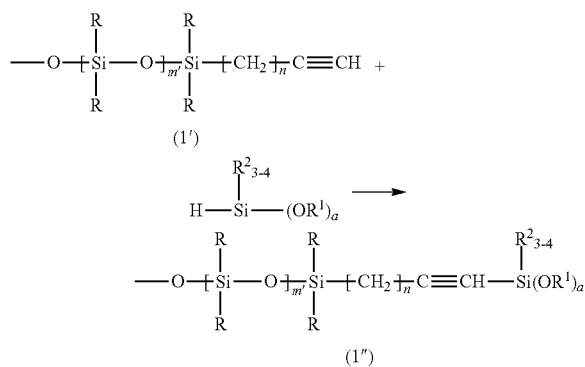

wherein R represents a hydrogen atom or a monovalent hydrocarbon group having 1 to 20 carbon atoms which may have a substituent; each R may be the same or different from each other; "m'" represents an integer of 0 to 2,000, parts of a repeating unit of the siloxane bond may be crosslinked to form a branched chain structure; "n" represents an integer of 0 to 20; $R^1$ represents an alkyl group having 1 to 20 carbon atoms which may have a substituent, and those having 3 or more carbon atoms among the alkyl groups may be a cycloalkyl group which is cyclic; $R^2$ represents a hydrogen atom or a monovalent hydrocarbon group having 1 to 20 carbon atoms which may have a substituent; and "a" is an integer of 1 to 3.

When such a method for preparing an organosiloxane polymer having an alkoxysilyl-ethylene group at the terminal is employed, an organosiloxane polymer having an alkoxysilyl-ethylene group at its terminal having excellent rapid curability, and providing good storage stability and durability can be prepared when it is used as a base polymer of a room temperature curable composition and the composition is cured.

Further, the present invention is to provide a room temperature curable composition (in particular, a room temperature curable organopolysiloxane composition) which comprises
(A) 100 parts by mass of the organosiloxane polymer having an alkoxysilyl-ethylene group at its terminal prepared by the method for preparing the organosiloxane polymer having an alkoxysilyl-ethylene group at its terminal,
(B) 0.001 to 15 parts by mass of a curing catalyst,
(C) 0 to 30 parts by mass of a silane and/or a partial hydrolysis condensate thereof,
(D) 0 to 1,000 parts by mass of a filler, and
(E) 0 to 30 parts by mass of an adhesion promoter.

When such a room temperature curable composition is employed, a cured product particularly excellent in rapid curability and simultaneously having good storage stability and durability can be provided.

In this case, the main chain of the Component (A) is preferably an organopolysiloxane.

When such a room temperature curable composition is employed, a cured product more excellent in rapid curability and having better durability and storage stability can be provided.

In this case, the room temperature curable composition is preferably used as either of a sealing agent, a coating agent or an adhesive.

When such a room temperature curable composition is employed, it is useful as a sealing agent, a coating agent and an adhesive which are required to have heat resistance, water resistance and humidity resistance.

Also, in the present invention, it is provided a molded product which is a cured product of the room temperature curable composition.

When such a molded product is employed, it can possess excellent heat resistance and durability.

Advantageous Effects of Invention

The novel organopolysiloxane compound having an ethynyl group of the present invention is expected to be used for a nonvolatile controller. Also, the method for preparing the linear organopolysiloxane compound having ethynyl groups at the both terminals of the molecular chain of the present invention can synthesize novel compounds represented by the formulae (1) and (2), and by adjusting the molar ratio of the compound represented by the formula (3) and the compound represented by the formula (4), adjustment of the polymerization degree is easy so that it is also excellent in productivity.

Also, the room temperature curable composition (in particular, a room temperature curable organopolysiloxane composition) of the present invention provides a cured product particularly excellent in rapid curability, and even after storage of, for example, 12 months, it rapidly cures when exposed to the air and shows excellent physical properties. The composition is useful as a sealing agent, a coating agent and an adhesive at the portions required to have heat resistance, water resistance and humidity resistance, and above all, it can be effectively used for a building use required to have steam resistance and water resistance, and an adhesive use for electric and electronic equipments.

DESCRIPTION OF EMBODIMENTS

In the following, the novel organopolysiloxane compound having an ethynyl group, the method for preparing the linear organopolysiloxane compound having ethynyl groups at the both terminals of the molecular chain, the method for preparing the organosiloxane polymer having an alkoxysilyl-ethylene group at its terminal, the room temperature curable organopolysiloxane composition and the molded product which is a cured product thereof of the present invention are explained in detail, but the present invention is not limited by these.

<Novel Organopolysiloxane Compound Having Ethynyl Group (Organopolysiloxane Compound Having Ethynyl Group at Terminal)>

The present invention relates to an organopolysiloxane compound which is either a linear or a branched (branched chain), and with a polymerization degree (or a repeating number of a diorganosiloxane unit in the molecule) of 21 or more which comprises having at least one unit represented by the following formula (1) as a partial structure, and preferably having two or more structural units represented by —Si(R)$_2$—[CH$_2$]$_n$—C≡CH in the molecule, particularly to a linear organopolysiloxane with a polymerization degree (m) of 21 or more having a structural unit represented by —Si(R)$_2$—[CH$_2$]$_n$—C≡CH at the both terminals of the molecular chain,

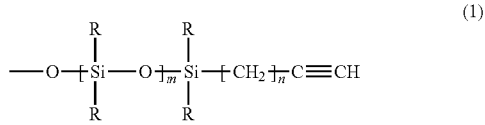
(1)

wherein R represents a hydrogen atom or a monovalent hydrocarbon group having 1 to 20 carbon atoms which may have a substituent; each R may be the same or different from each other; "m" represents an integer of 21 to 2,000, preferably an integer of 22 to 1,600, more preferably an integer of 23 to 1,000, further preferably an integer of 24 to 500, parts of a repeating unit of the siloxane bond may be crosslinked to form a branched chain structure; and "n" represents an integer of 0 to 20, preferably an integer of 0 to 10, more preferably an integer of 0 to 5, further preferably an integer of 0 to 3.

The organopolysiloxane compound having an ethynyl group comprises a material having an ethynyl group (or a terminal ethynyl group-substituted alkyl group) on the silicon of at least one terminal of the organosiloxane polymer.

When such an organopolysiloxane compound is employed, it has high hydrosilylation reactivity with a silicon compound having an Si—H bond, and it can be expected to use as a nonvolatile controller.

R in the partial structural formula (1) is not particularly limited so long as it is within the range, and may be preferably mentioned a hydrogen atom, a saturated aliphatic monovalent hydrocarbon group which may have a substituent, an unsaturated aliphatic monovalent hydrocarbon group which may have a substituent, an aromatic monovalent hydrocarbon group (including an aromatic hetero ring) which may have a substituent, more preferably a hydrogen atom, a saturated aliphatic monovalent hydrocarbon group which may have a substituent, an aromatic monovalent hydrocarbon group which may have a substituent, particularly preferably a saturated aliphatic monovalent hydrocarbon group which may have a substituent.

The saturated aliphatic monovalent hydrocarbon group which may have a substituent may be specifically mentioned the groups having 1 to 20 carbon atoms, preferably 1 to 12 carbon atoms, more preferably 1 to 6 carbon atoms including a linear alkyl group such as a methyl group, an ethyl group, a propyl group, a butyl group, a pentyl group, a hexyl group, a heptyl group, an octyl group, etc.; a branched alkyl group such as an isopropyl group, an isobutyl group, a tert-butyl group, an isopentyl group, a neopentyl group, etc.; a cycloalkyl group such as a cyclopentyl group, a cyclohexyl group, a cycloheptyl group, etc.; a halogenated alkyl group such as a chloromethyl group, a 3-chloropropyl group, a 3,3,3-trifluoropropyl group, a bromopropyl group, etc.

The unsaturated aliphatic monovalent hydrocarbon group which may have a substituent may be specifically mentioned the groups having 1 to 20 carbon atoms, preferably 1 to 12 carbon atoms, more preferably 1 to 6 carbon atoms including an ethenyl group, a 1-methylethenyl group, a 2-propenyl group, an ethynyl group, a 2-propynyl group, etc.

The aromatic monovalent hydrocarbon group which may have a substituent may be specifically mentioned the groups having 1 to 20 carbon atoms, preferably 1 to 12 carbon atoms, more preferably 1 to 6 carbon atoms including an aryl group such as a phenyl group, a tolyl group, etc.; an aralkyl group such as a benzyl group, a 2-phenylethyl group, etc., a halogenated aryl group such as an α,α,α'-trifluorotolyl group, a chlorobenzyl group, etc.

Among these, a methyl group, an ethyl group, a 3,3,3-trifluoropropyl group and a phenyl group are preferred, and more preferably a methyl group, an ethyl group and a phenyl group.

Specific examples of the novel organopolysiloxane compound which is a linear or a branched, and having the ethynyl groups (organopolysiloxane compound having the ethynyl groups at the terminals) which have at least one partial structure represented by the formula (1) in the molecule, may be mentioned as follows. In the following specific examples, Me represents a methyl group, Et an ethyl group, and Ph a phenyl group.

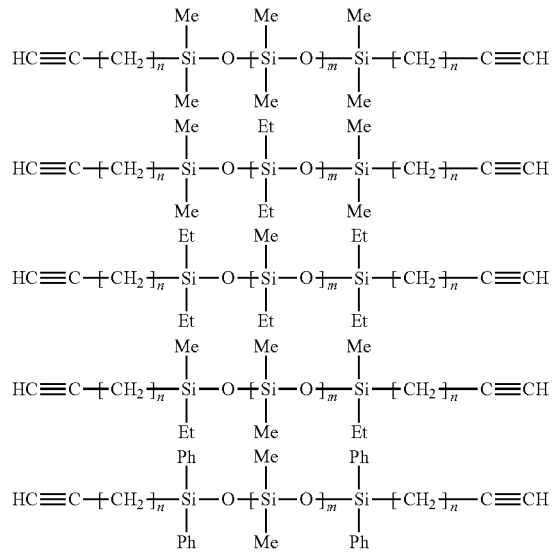

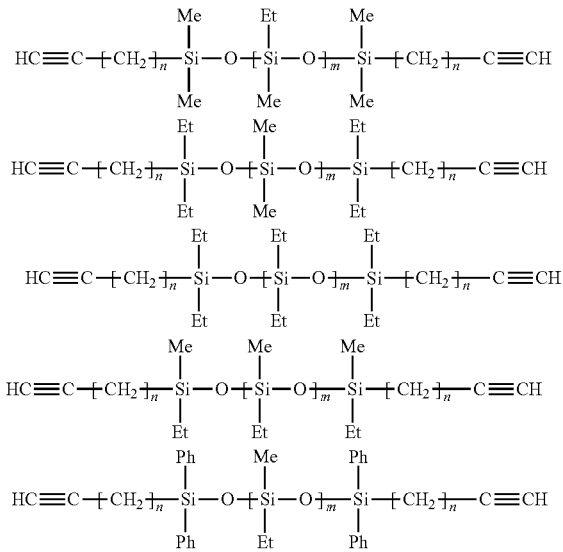

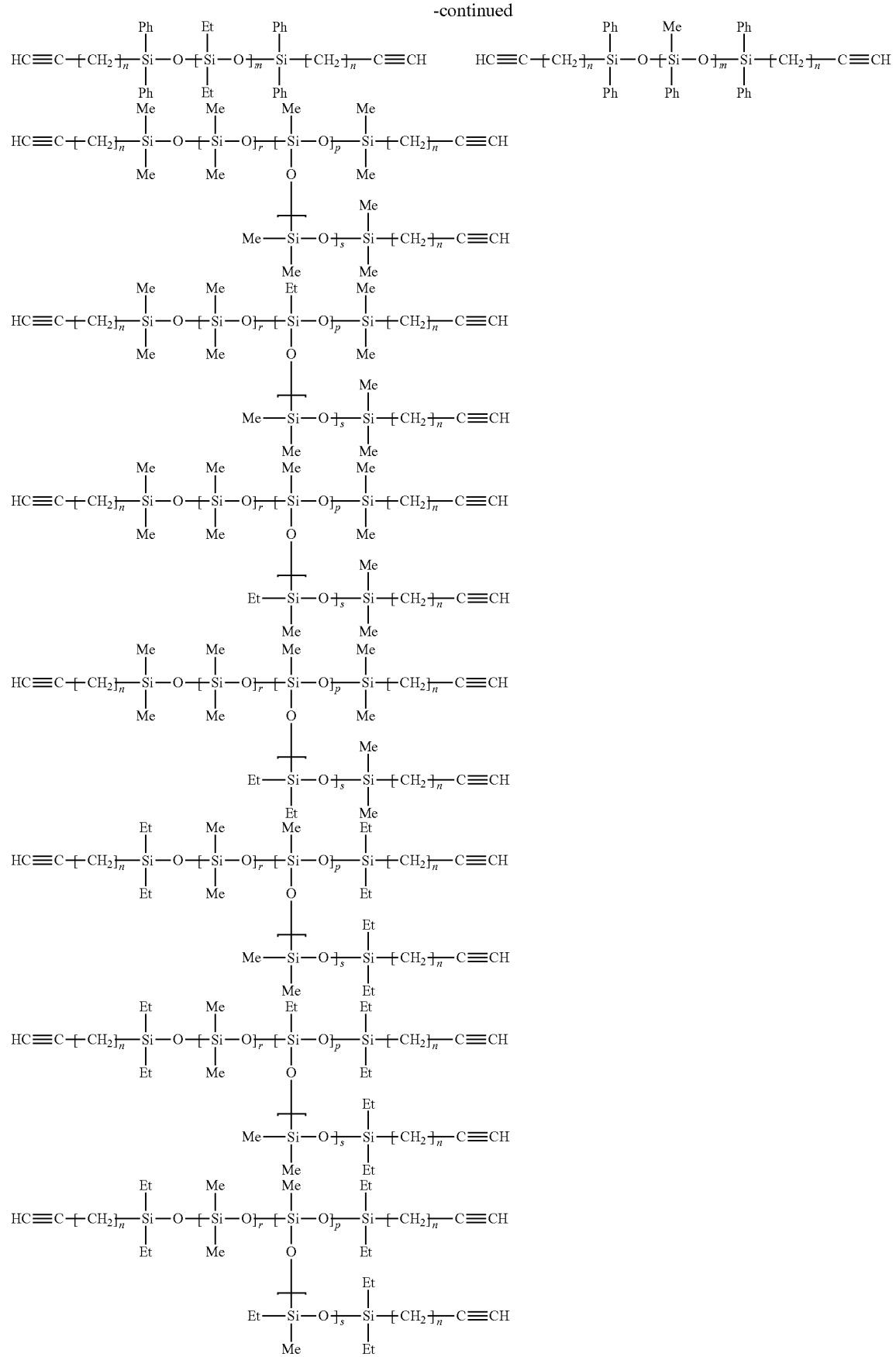

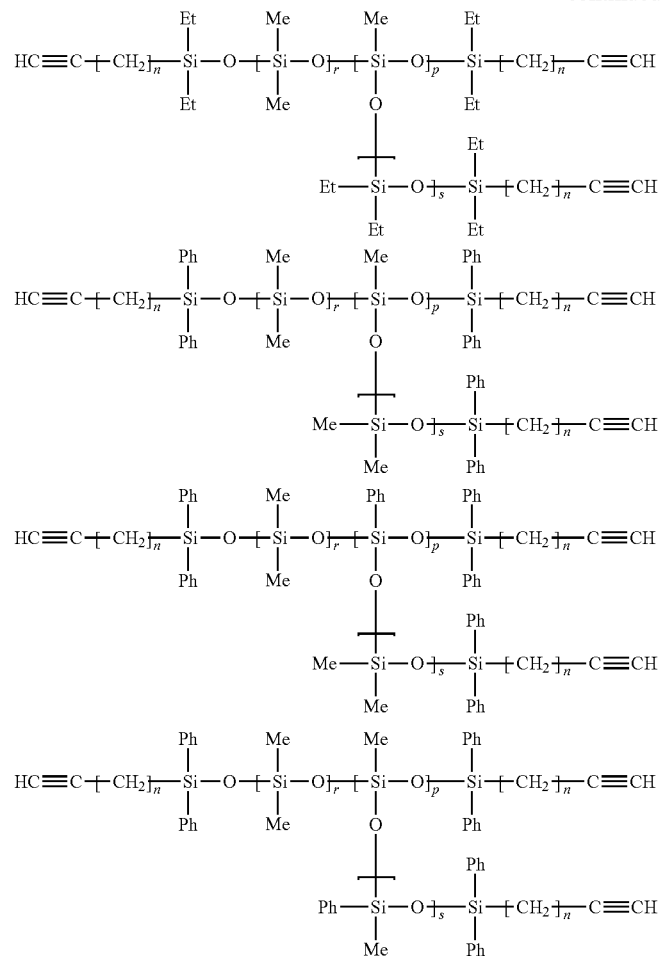
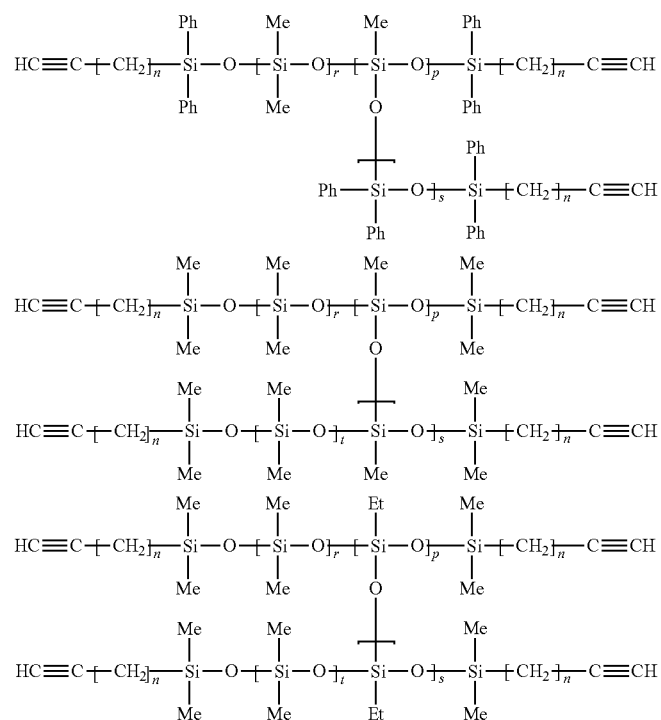

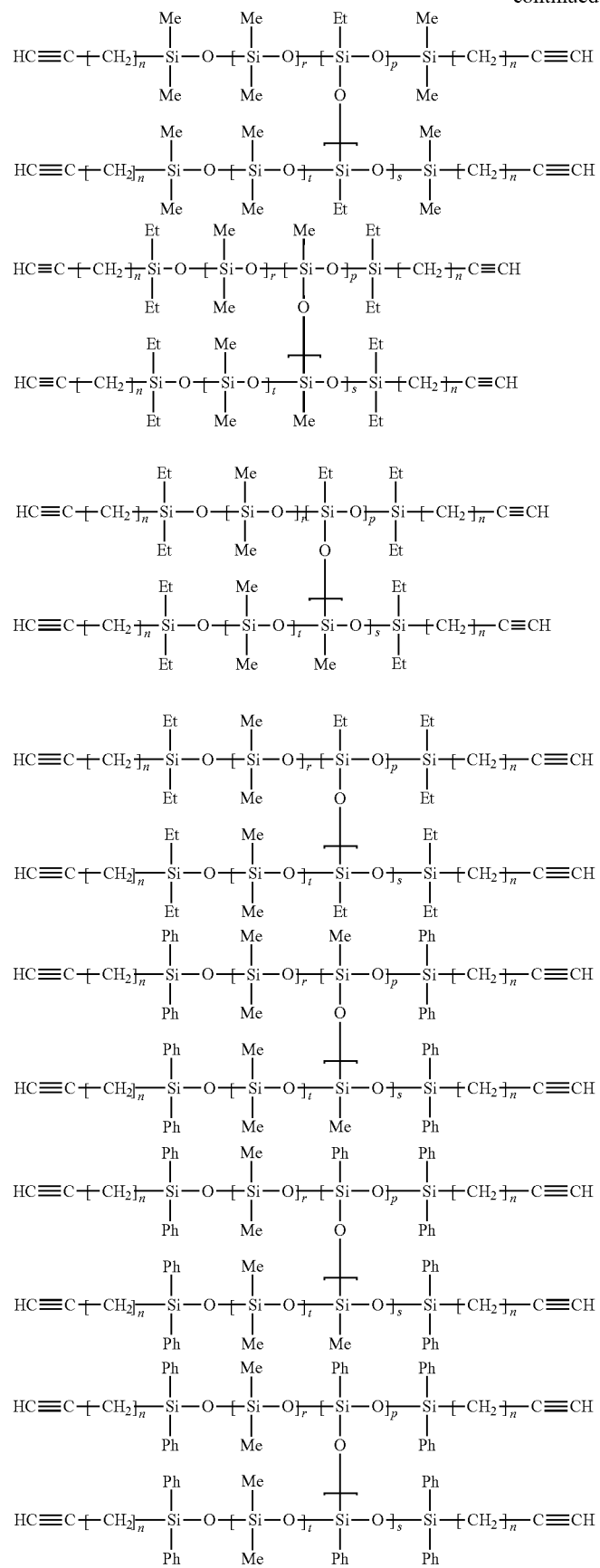

wherein "n" represents an integer of 0 to 20, preferably an integer of 0 to 10, more preferably an integer of 0 to 5, further preferably an integer of 0 to 3; "m" represents an integer of 21 to 2,000, preferably an integer of 22 to 1,600, more preferably an integer of 23 to 1,000, further preferably an integer of 24 to 500; each of "p", "r", "s" and "t" independently represent an integer of 1 or more, each of which may be the same or different from each other; "p" is preferably 1 to 100, more preferably 1 to 50; "r" is preferably 20 to 800, more preferably 20 to 500; "s" is preferably 1 to 200, more preferably 1 to 100; "t" is preferably 20 to 800, more preferably 20 to 500; p+r+s or p+r+s+t preferably represents an integer of 22 to 1,000, more preferably an integer of 23 to 500, and p+r=m. Also, a viscosity of the organopolysiloxane compound having ethynyl groups at the terminals is not particularly limited, and is preferably a positive integer satisfying the viscosity at 25° C. of 10 to 100,000 mP·s, more preferably 1,000 to 10,000 mP·s.

Incidentally, in the present invention, the polymerization degree (or a molecular weight) can be measured, for example, as a weight average polymerization degree (or weight average molecular weight), etc., by gel permeation chromatography (GPO) analysis using toluene or tetrahydrofuran (THF), etc., as a developing solvent.

Also, the viscosity (25° C.) can be measured by a rotary viscometer (for example, BL type, BH type, BS type, and cone plate type), etc.

The novel organopolysiloxane compound having an ethynyl group of the present invention can be prepared by, for example, the method for preparing the linear organopolysiloxane compound having ethynyl groups at the both terminals of the molecular chain of the present invention.

<Method for Preparing Linear Organopolysiloxane Compound Having Ethynyl Groups at the Both Terminals of the Molecular Chain>

The present invention relates to a method for preparing a linear organopolysiloxane compound having ethynyl groups at the both terminals of the molecular chain which is prepared by an equilibration reaction of the compound represented by the following formula (3) and the compound represented by the following general formula (4) in the presence of an acidic catalyst.

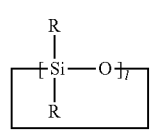

(3)

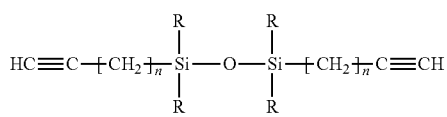

(4)

—Starting Materials—

The main starting material of the present invention may be mentioned a cyclic organosiloxane compound (R represents a hydrogen atom or a monovalent hydrocarbon group having 1 to 20 carbon atoms which may have a substituent; each R may be the same or different from each other; and "l" is an integer of 3 to 20, preferably an integer of 4 to 7.) represented by the following formula (3)

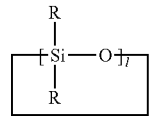

(3)

R in the formula (3) is not particularly limited so long as it is within the range, and is preferably mentioned a hydrogen atom, a saturated aliphatic monovalent hydrocarbon group which may have a substituent, an unsaturated aliphatic monovalent hydrocarbon group which may have a substituent and an aromatic monovalent hydrocarbon group (including an aromatic hetero ring) which may have a substituent, more preferably a hydrogen atom, a saturated aliphatic monovalent hydrocarbon group which may have a substituent and an aromatic monovalent hydrocarbon group which may have a substituent, particularly preferably a saturated aliphatic monovalent hydrocarbon group which may have a substituent.

The saturated aliphatic monovalent hydrocarbon group which may have a substituent may be specifically exemplified by the groups having 1 to 20 carbon atoms, preferably 1 to 12 carbon atoms, more preferably 1 to 6 carbon atoms including a linear alkyl group such as a methyl group, an ethyl group, a propyl group, a butyl group, a pentyl group, a hexyl group, a heptyl group, an octyl group, etc., a branched alkyl group such as an isopropyl group, an isobutyl group, a tert-butyl group, an isopentyl group, a neopentyl group, etc., a cycloalkyl group such as a cyclopentyl group, a cyclohexyl group, a cycloheptyl group, etc., a halogenated alkyl group such as a chloromethyl group, a 3-chloropropyl group, a 3,3,3-trifluoropropyl group, a bromopropyl group, etc.

The unsaturated aliphatic monovalent hydrocarbon group which may have a substituent may be specifically mentioned the groups having 1 to 20 carbon atoms, preferably 1 to 12 carbon atoms, more preferably 1 to 6 carbon atoms including an ethenyl group, a 1-methylethenyl group, a 2-propenyl group, an ethynyl group, a 2-propynyl group, etc.

The aromatic monovalent hydrocarbon group which may have a substituent may be exemplified by the groups having 1 to 20 carbon atoms, preferably 1 to 12 carbon atoms, more preferably 1 to 6 carbon atoms including an aryl group such as a phenyl group, a tolyl group, etc., an aralkyl group such as a benzyl group, a 2-phenylethyl group, etc., a halogenated aryl group such as an α,α,α-trifluorotolyl group, a chlorobenzyl group, etc.

Among these, a methyl group, an ethyl group, a 3,3,3-trifluoropropyl group and a phenyl group are preferred, more preferably a methyl group, an ethyl group and a phenyl group, particularly preferably a methyl group.

Specific examples of the formula (3) may be mentioned hexamethylcyclotrisiloxane, octamethylcyclotetrasiloxane, decamethylcyclopentasiloxane, dodecamethylcyclohexasiloxane, hexaethylcyclotrisiloxane, octaethylcyclotetrasiloxane, hexaphenylcyclotrisiloxane, octaphenylcyclotetrasiloxane, etc.

Also, the starting material for the terminal of the present invention may be mentioned an organodisiloxane compound having ethynyl groups at its terminals (R represents a hydrogen atom or a hydrocarbon group having 1 to 20 carbon atoms which may have a substituent; each R may be the same or different from each other; "n" is an integer of 0 to 20, preferably 0 to 10.) represented by the following formula (4).

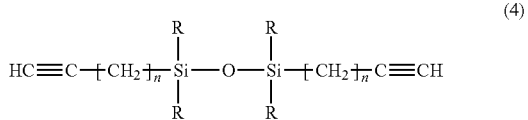

(4)

R in the formula (4) is not particularly limited so long as it is within the range, and is preferably mentioned a hydrogen atom, a saturated aliphatic monovalent hydrocarbon group which may have a substituent and an aromatic monovalent hydrocarbon group (including an aromatic hetero ring) which may have a substituent, more preferably a hydrogen atom, a saturated aliphatic monovalent hydrocarbon group which may have a substituent, particularly preferably a saturated aliphatic monovalent hydrocarbon group which may have a substituent.

The saturated aliphatic monovalent hydrocarbon group which may have a substituent may be specifically exemplified by the groups having 1 to 20 carbon atoms, preferably 1 to 12 carbon atoms, more preferably 1 to 6 carbon atoms including a linear alkyl group such as a methyl group, an ethyl group, a propyl group, a butyl group, a pentyl group, a hexyl group, a heptyl group, an octyl group, etc.; a branched alkyl group such as an isopropyl group, an isobutyl group, a tert-butyl group, an isopentyl group, a neopentyl group, etc.; a cycloalkyl group such as a cyclopentyl group, a cyclohexyl group, a cycloheptyl group, etc.; a halogenated alkyl group such as a chloromethyl group, a 3-chloropropyl group, a 3,3,3-trifluoropropyl group, a bromopropyl group, etc.

The aromatic monovalent hydrocarbon group which may have a substituent may be exemplified by the groups having 1 to 20 carbon atoms, preferably 1 to 12 carbon atoms, more preferably 1 to 6 carbon atoms including an aryl group such as a phenyl group, a tolyl group, etc.; an aralkyl group such as a benzyl group, 2-phenylethyl group, etc.; and a halogenated aryl group such as an $\alpha,\alpha,\alpha$-trifluorotolyl group, a chlorobenzyl group, etc.

Among these, a methyl group, an ethyl group, a 3,3,3-trifluoropropyl group and a phenyl group are preferred, more preferably a methyl group and a 3,3,3-trifluoropropyl group, particularly preferably a methyl group.

Specific examples of the formula (4) may be mentioned 1,3-diethynyldisiloxane, 1,3-diethynyl-1,3-dimethyldisiloxane, 1,3-diethynyl-1,3-diphenyldisiloxane, 1,3-diethynyl-1,1,3,3,3-tetramethyldisiloxane, 1,3-diethynyl-1,1,3,3-tetraphenyldisiloxane, 1,3-diethynyl-1,3-dimethyl-1,3-diphenyldisiloxane, 1,5-diethynyl-trisiloxane, 1,5-diethynyl-1,3,5-trimethyltrisiloxane, 1,5-diethynyl-1,3,5-triphenyltrisiloxane, 1,5-diethynyl-1,1,3,3,5,5-hexamethyltrisiloxane, 1,5-diethynyl-1,1,3,3,5,5-hexaphenyltrisiloxane, 1,5-diethynyl-1,3,5-trimethyl-1,3,5-triphenyltrisiloxane, 1,7-diethynyltetra-siloxane, 1,7-diethynyl-1,3,5,7-tetramethyltetrasiloxane, 1,7-diethynyl-1,3,5,7-tetraphenyltetrasiloxane, 1,5-diethynyl-1,1,3,3,5,5,7,7-octamethyltetrasiloxane, 1,5-diethynyl-1,1,3,3,5,5,7,7-octaphenyltrisiloxane, 1,5-diethynyl-1,3,5,7-tetramethyl-1,3,5,7-tetraphenyl-trisiloxane, etc.

—Equilibration Reaction by Acidic Catalyst—

The preparation method of the present invention is carried out by the equilibration reaction where it has been well known except that the organodisiloxane compound having ethynyl groups at its terminals is used as the starting material for the terminal, and the compound and the cyclic organosiloxane compound are reacted with the co-presence of an acidic catalyst. For example, it may be carried out at 10° C. to 180° C. without using a solvent, and polymerization may be carried out by the equilibration reaction using a suitable solvent. The acidic catalyst may be mentioned sulfuric acid or trifluoromethanesulfonic acid, etc.

In general, when sulfuric acid or trifluoromethanesulfonic acid is used as the catalyst, the equilibration reaction is carried out at a relatively low temperature, for example, 10° C. to 150° C., preferably 20° C. to 100° C., and the acidic catalyst is used in an amount of 0.1 to 10% by weight, preferably 1 to 5% by weight based on the organosiloxane compound of the whole starting materials.

An amount of the organodisiloxane compound having ethynyl groups at its terminals to be used as the starting material may vary depending on the polymerization degree (i.e., "m" in the formula (2)) of the linear organopolysiloxane compound having ethynyl groups at the both terminals of the molecular chain to be obtained, and the amount can be obtained by the content of the ethynyl groups bonded to the silicon of the organodisiloxane compound having ethynyl groups at its terminals.

After completion of the reaction, neutralization and filtration of the catalyst are carried out, then, the filtrate is applied to purification such as distillation, etc., to obtain an objective organopolysiloxane compound having ethynyl groups at both terminals.

According to the method for preparing a linear organopolysiloxane compound having ethynyl groups at the both terminals of the molecular chain of the present invention, as a typical example thereof, a linear organopolysiloxane compound having ethynyl groups at the both terminals of the molecular chain having such a molecular composition can be obtained by selecting the amounts of the cyclic organosiloxane compound and the organodisiloxane compound having ethynyl groups at its terminals that the molecular composition of the formed linear organopolysiloxane compound having ethynyl groups at the both terminals of the molecular chain comprises 75.0 to 99.5 mole % of an $R_2SiO_{2/2}$ unit which is a repeating unit of the diorganosiloxane unit which constitutes the main chain, and 0.5 to 15.0 mole % of a $HC\equiv C$—$[CH_2]_n$—$(R)_2SiO_{1/2}$ unit (wherein R is a methyl group, an ethyl group, a phenyl group, etc.) which is a silyl group (a siloxy unit) constituting the terminal of the molecular chain, and the total being 100 mole % with these siloxane units. Also, the viscosity of the linear organopolysiloxane compound having ethynyl groups at the both terminals of the molecular chain is not particularly limited, and a viscosity at 25° C. is preferably 10 to 100,000 mP·s, more preferably 1,000 to 10,000 mP·s.

The linear organopolysiloxane compound having ethynyl groups at the both terminals of the molecular chain having such a molecular structure is expected to improve an addition reaction rate of a hydrosilane to the terminal unsaturated group by a platinum catalyst, as compared with the organopolysiloxane compound having a vinyl group at its terminal. In addition, the linear organopolysiloxane compound having ethynyl groups at the both terminals of the molecular chain is useful in the points that it can be expected to use as a nonvolatile controller, etc.

Also, the preparation method is useful in the point that the linear organopolysiloxane compound having ethynyl groups at the both terminals of the molecular chain having an objective polymerization degree can be prepared easily.

Incidentally, among the organosiloxane polymers having at least one unit of the formula (1) as a partial structure, with regard to the branched siloxane polymer, it can be prepared by the method in which a branched unit ($RSiO_{3/2}$) is co-presented in the polymerization by an equilibration reaction of the compound represented by the formula (3) and the compound represented by the formula (4) in the presence of the acidic catalyst, or by the method in which a branched organopolysiloxane having no functional group and the compound represented by the formula (4) are subjected to equilibration reaction, etc.

<Method for Preparing Organosiloxane Polymer Having Alkoxysilyl-Ethylene Group at Terminal>

The present invention also provides a method for preparing an organosiloxane polymer having an alkoxysilyl-ethylene group at its terminal which comprises subjecting an organopolysiloxane compound which is either a linear or a branched (branched chain), and having at least one unit of the following formula (1') as a partial structure and an alkoxysilane having one hydrogen atom bonded to a silicon atom (an SiH group) in the molecule to addition reaction according to the following reaction scheme, to prepare an organosiloxane polymer which is either a linear or a branched (branched chain), and having an alkoxysilyl-ethylene group at its terminal having at least one unit of the following formula (1"), preferably having 2 or more in the molecule,

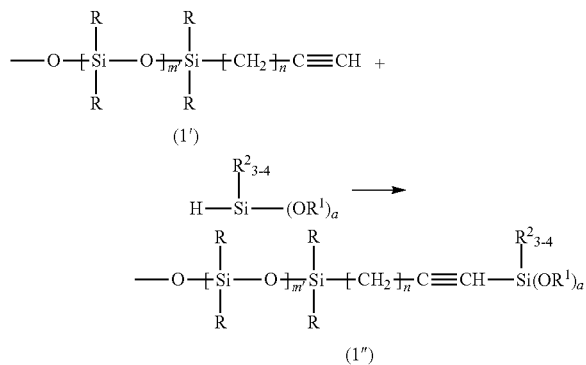

wherein R represents a hydrogen atom or a monovalent hydrocarbon group having 1 to 20 carbon atoms which may have a substituent; each R may be the same or different from each other; "m'" represents an integer of 0 to 2,000, preferably an integer of 21 to 1,600, more preferably an integer of 22 to 1,000, further preferably an integer of 24 to 500; parts of a repeating unit of the siloxane bond may be crosslinked to form a branched chain structure; "n" represents an integer of 0 to 20, preferably an integer of 0 to 10, more preferably an integer of 0 to 5, further preferably an integer of 0 to 3; $R^1$ represents an alkyl group having 1 to 20 carbon atoms which may have a substituent, and those having 3 or more carbon atoms among the alkyl groups may be a cycloalkyl group which is cyclic; $R^2$ represents a hydrogen atom or a monovalent hydrocarbon group having 1 to 20 carbon atoms which may have a substituent; and "a" represents an integer of 1 to 3.

The addition reaction catalyst may be mentioned a platinum group series catalyst, for example, a platinum series, a palladium series and a rhodium series material, and a platinum series material is particularly suitable. The platinum series material may be exemplified by platinum black or a material in which solid platinum is carried on a carrier such as alumina, silica, etc., chloroplatinic acid, alcohol-modified chloroplatinic acid, a complex of chloroplatinic acid and an olefin, or a complex of platinum and vinylsiloxane, etc. An amount of these platinum to be used may be the so-called catalytic amount and, for example, it may be used in an amount of 0.1 to 1,000 ppm in terms of platinum group metal based on the amount of the trialkoxysilanes, particularly in an amount of 0.5 to 100 ppm.

The reaction is desirably carried out, in general, at a temperature of 50 to 120° C., particularly at 60 to 100° C. for 0.5 to 12 hours, particularly for 1 to 6 hours, and may be carried out without using any solvent, but a suitable solvent such as toluene, xylene, etc., may be used, if necessary, as long as it does not exert any bad effect to the addition reaction, etc.

In the addition reaction to the terminal acetylene group, for example, a geometric isomer represented by the following reaction scheme [X] is formed. Formation of an E isomer (a trans isomer) is highly selective and is high reactivity, but in the organopolysiloxane of the present invention, it does not exert any bad effect to the characteristics, so that these isomers can be used as such without isolation thereof,

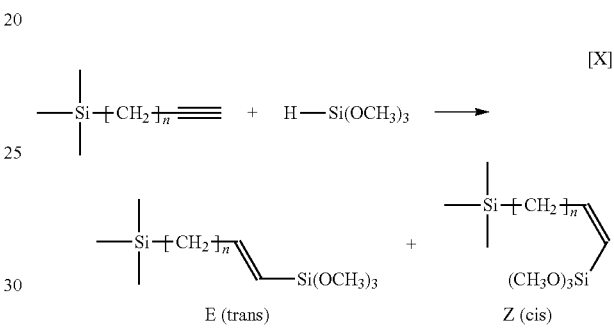

wherein "n" is as mentioned above.

The present inventors have further earnestly studied, and as a result, they have found that hydrolyzability of the alkoxy group is remarkably improved only when the bonding group adjacent to the alkoxysilyl group is an ethylene group, and when the organosiloxane polymer having an alkoxysilyl-ethylene group at its terminal having at least one unit of the following formula (1"), preferably having 2 or more in the molecule, which is prepared by the preparation method is used as a base polymer of the room temperature curable composition (in particular, a room temperature curable organopolysiloxane composition) which crosslinks and cures by condensation reaction, a room temperature curable composition (in particular, a room temperature curable organopolysiloxane composition) which gives a cured product particularly excellent in rapid curability and simultaneously having good storage stability and durability can be obtained, whereby accomplished the present invention,

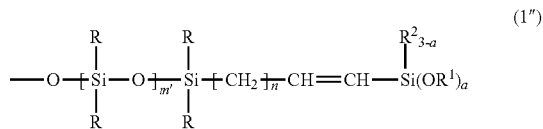

wherein R represents a hydrogen atom or a monovalent hydrocarbon group having 1 to 20 carbon atoms which may have a substituent; each R may be the same or different from each other; "m'" represents an integer of 0 to 2,000, preferably an integer of 21 to 1,600, more preferably an integer of 22 to 1,000, further preferably an integer of 24 to 500; parts of a repeating unit of the siloxane bond may be crosslinked to form a branched chain structure; "n" represents an integer of 0 to 20, preferably an integer of 0 to 10, more preferably an integer of 0 to 5, further preferably an integer of 0 to 3; $R^1$ represents an alkyl group having 1 to 20 carbon atoms which may have a substituent, and those having 3 or more carbon atoms among the alkyl groups may be a cycloalkyl group which is cyclic; $R^2$ represents a hydrogen atom or a monovalent hydrocarbon group having 1 to 20 carbon atoms which may have a substituent; and "a" represents an integer of 1 to 3.

In the following, the present invention is explained in more detail.

<Room Temperature Curable Composition>

—Component (A)—

The polymer having at least one alkoxysilyl-ethylene group at the molecular chain terminal, preferably 2 or more in the molecule, which is Component (A), is used as a main agent (a base polymer) of the composition, and may be linear or branched. The polymer may be constituted by various units, for example, a polysiloxane, a polyether, a polyurethane, a polyurea, a polyester, a polysiloxane-urea/urethane copolymer, a polyacrylate and a polymethacrylate, a polycarbonate, a polystyrene, a polyimide, a polyvinyl ester, or a polyolefin such as a polyethylene, a polybutadiene, an ethylene-olefin copolymer or a styrene-butadiene copolymer. An optional mixture or combination of these polymers may be used.

The organosiloxane polymer having an alkoxysilyl-ethylene group at its terminal having at least one unit of the formula (1") in the molecule, preferably 2 or more may be particularly preferably mentioned those having at least one unit of the following formula (1a) in the molecule, preferably 2 or more (i.e., n=0 in the formula (1")). In the following, explanation is made using those having at least one unit of the following formula (1a) in the molecule, preferably 2 or more,

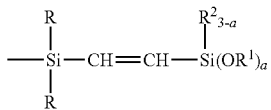

(1a)

wherein R, $R^1$, $R^2$ and "a" have the same meanings as defined above.

Among the exemplary polymers mentioned above, the polysiloxane particularly excellent in durability is a novel compound, which is suitably used, and a linear or a branched chain diorganopolysiloxane having 2 or more units of the formula (1 a) specifically represented by the following general formulae (2a) and/or (3a) at the terminals of the molecular chain is used,

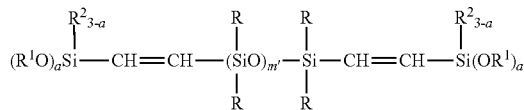

(2a)

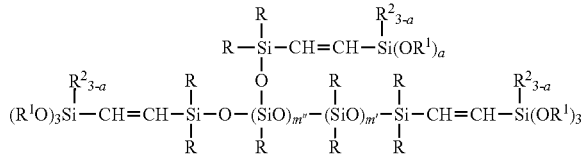

wherein R, $R^1$, $R^2$, "a" and "m" have the same meanings as defined above, "m" represents an integer of 1 to 100, preferably an integer of 1 to 50, and m'+m" is a number which makes the viscosity of the diorganopolysiloxane at 25° C. of 10 to 1,000,000 mPa·s.

The substituted or unsubstituted monovalent hydrocarbon group of $R^1$ and $R^2$ in the formula may be exemplified by an alkyl group such as a methyl group, an ethyl group, a propyl group, a butyl group, a pentyl group, a hexyl group, a heptyl group, an octyl group, a nonyl group, a decyl group, an octadecyl group, etc.; a cycloalkyl group such as a cyclopentyl group, a cyclohexyl group, etc.; an alkenyl group such as a vinyl group, an allyl group, a butenyl group, a pentenyl group, a hexenyl group, etc.; an aryl group such as a phenyl group, a tolyl group, a xylyl group, an α- or β-naphthyl group, etc.; an aralkyl group such as a benzyl group, a 2-phenylethyl group, a 3-phenylpropyl group, etc.; or a group in which a part or whole of the hydrogen atoms of these groups is/are substituted by a halogen atom such as F, Cl, Br, etc., or by a cyano group, etc., for example, a 3-chloropropyl group, a 3,3,3-trifluoropropyl group, a 2-cyanoethyl group, etc. Among these, a methyl group and an ethyl group are preferred, and a methyl group is particularly preferred.

The hydrolyzable group at the molecular chain terminal may be mentioned, for example, an alkoxy group such as a methoxy group, an ethoxy group, a propoxy group, a 2-ethylhexoxy group, etc.; an alkoxyalkoxy group such as a methoxyethoxy group, an ethoxyethoxy group, a methoxypropoxy group, etc. Among these, a methoxy group and an ethoxy group are particularly preferred since curing is rapid.

The diorganopolysiloxane of Component (A) preferably has a viscosity at 25° C. of 10 to 1,000,000 mPa·s, more preferably 50 to 500,000 mPa·s, particularly preferably 100 to 100,000 mPa·s, especially 100 to 80,000 mPa·s. If the viscosity of the diorganopolysiloxane is 10 mPa·s or more, a coating film excellent in physical and mechanical strength can be easily obtained, while if it is 1,000,000 mPa·s or less, the viscosity of the composition does not become too high and workability at the time of use is good so that it is preferred. Here, the viscosity is a numerical value measured by a rotary viscometer.

Specific examples of the diorganopolysiloxane of Component (A) may be mentioned, for example, as shown below,

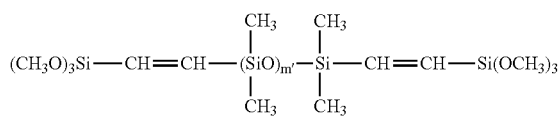

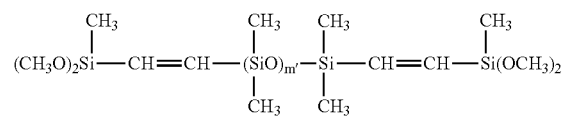

-continued

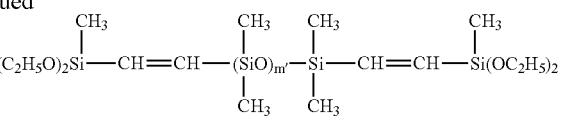
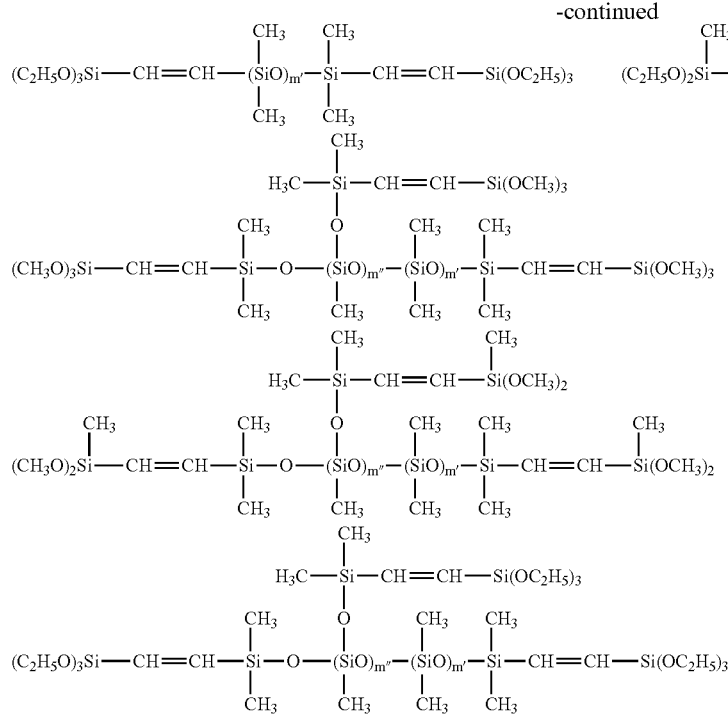

wherein "m'", "m''", $R^1$ and $R^2$ have the same meanings as defined above.

The diorganopolysiloxane of Component (A) may be used a single kind alone or in combination of two or more kinds having different structures and/or molecular weights.

—Component (B)—

Component (B) is a curing catalyst, and is used for curing the composition. The organometallic catalyst may be mentioned an alkyltin ester compound such as dibutyltin diacetate, dibutyltin dilaurate, dibutyltin dioctoate, etc.; a titanate or a titanium chelate compound such as tetraisopropoxy titanium, tetra-n-butoxy titanium, tetrakis(2-ethylhexoxy) titanium, dipropoxy bis(acetyl-actonato)titanium, titanium isopropoxyoctylene glycol, etc.; an organometallic compound such as zinc naphthenate, zinc stearate, zinc-2-ethyloctoate, iron-2-ethylhexoate, cobalt-2-ethylhexoate, manganese-2-ethylhexoate, cobalt naphthenate, an alkoxy aluminum compound, etc.; an aminoalkyl group-substituted alkoxysilane such as 3-aminopropyltriethoxysilane, N-β-(aminoethyl)-γ-aminopropyltrimethoxysilane, etc.; an amine compound and a salt thereof such as hexylamine, dodecylamine phosphate, etc.; a quaternary ammonium salt such as benzyl triethyl ammonium acetate, etc., a lower aliphatic acid salt of an alkali metal such as potassium acetate, sodium acetate, lithium oxalate, etc.; a dialkylhydroxylamine such as dimethylhydroxylamine, diethylhydroxylamine, etc.; a silane or a siloxane having a guanidyl group such as tetramethylguanidylpropyltrimethoxysilane, tetramethylguanidylpropylmethyldimethoxysilane, tetramethylguanidylpropyltris(trimethylsiloxy)silane, etc., and these are not limited to only one kind, and may be used as a mixture of two or more kinds.

A formulation amount of Component (B) is 0.001 to 15 parts by mass based on 100 parts by mass of the Component (A), particularly preferably 0.005 to 10 parts by mass.

—Component (C)—

A silane and/or a partial hydrolysis condensate thereof which is Component (C) is a crosslinking agent. Specific examples thereof may be mentioned, for example, ethylsilicate, propylsilicate, methyltrimethoxysilane, methyltriethoxysilane, vinyltrimethoxysilane, vinyltris-ethoxysilane, methyltris(methoxyethoxy)silane, vinyltris-(methoxyethoxy) silane, methyltripropenoxysilane, etc., and a partial hydrolysis condensate thereof. In the present invention, a partial hydrolysis condensate means an organosiloxane polymer having at least 2, preferably 3 or more remaining alkoxy groups (or alkoxy-substituted alkoxy groups) in the molecule, which is formed by partially hydrolyzing and condensing the silane compound. These may be used a single kind alone or may be used in combination of two or more kinds.

A formulation amount of Component (C) is generally 0 to 30 parts by mass based on 100 parts by mass of the Component (A), preferably 0.1 to 20 parts by mass, more preferably 0.5 to 15 parts by mass. If the formulation amount exceeds 30 parts by mass, there are cases where a problem occurs that the cured product becomes too hard or it becomes economically disadvantageous.

—Component (D)—

Component (D) is a filler, and to be used for providing sufficient mechanical strength to the cured product formed by the composition. The filler may be used those well-known in the art and may be mentioned, for example, dry silica such as calcined silica, pulverized silica, aerosol silica (fumed silica), silica aerogel, etc., wet silica such as precipitated silica, sol-gel method silica, etc., reinforcing silica type fine powder such as diatomaceous earth, etc., a metal oxide such as iron oxide, zinc oxide, titanium oxide, etc., or a material in which the surface of the above is subjected to hydrophobic treatment by an organosilane or an organosilazane, etc., a metal carbonate such as calcium carbonate, magnesium carbonate, zinc carbonate, etc., asbestos, glass wool, carbon black, fine particle mica, fused silica powder (quartz powder), synthetic resin powder of a polystyrene, a polyvinyl chloride, a polypropylene, etc.

A formulation amount of Component (D) is 0 to 1,000 parts by mass based on 100 parts by mass of the Component (A), particularly preferably 1 to 400 parts by mass. If it is used larger than 1,000 parts by mass, not only a viscosity of the composition is increased to become the workability worse, but also rubber strength after curing is lowered to difficulty obtain rubber elasticity. If it is formulated in an amount of 1 part by mass or more, mechanical strength of the resulting cured product can be made sufficiently high.

—Component (E)—

Component (E) is an adhesion additive, and used for providing sufficient adhesiveness to the cured product formed from the composition.

In particular, aminosilanes such as γ-aminopropyltriethoxysilane, 3-2-(aminoethylamino)propyltrimethoxy-silane, etc., epoxysilanes such as γ-glycidoxypropyltrimethoxysilane, β-(3,4-epoxycyclohexyl)ethyltrimethoxysilane, etc., and isocyanate silane, etc., are preferably formulated.

Component (E) is formulated in an amount of 0 to 30 parts by mass based on 100 parts by mass of the Component (A), particularly preferably 0.1 to 20 parts by mass.

Also, to the room temperature curable composition of the present invention may be formulated, as an additive, a conventionally known additive such as a pigment, a dye, an antiaging agent, an antioxidant, an antistatic agent, a flame retardant such as antimony oxide, paraffin chloride, etc. Further, a polyether as a thixotropic property improver, an antifungal agent, an antimicrobial agent, may be formulated.

Further, the room temperature curable composition of the present invention can be obtained by uniformly mixing the predetermined amounts of the respective components, and further the various kinds of additives in a dry atmosphere.

Moreover, the room temperature curable composition cures by allowing to stand at room temperature, and the molding method and the curing conditions, etc., may be employed the conventionally known method and conditions depending on the kind of the composition.

The thus obtained room temperature curable composition of the present invention rapidly cures at room temperature by the moisture in the air to form a rubber elastomer cured product excellent in heat resistance, weather resistance, low temperature characteristics, and adhesiveness to the various kinds of substrate materials, particularly to metal. Also, the composition is particularly excellent in storage stability and curability, and even after storage of, for example, 6 months, it rapidly cures when it is exposed to the air and provides a cured product having excellent physical properties as mentioned above. In particular, it does not discharge any poisonous or corrosive gas at the time of curing, so that no patina is formed at the surface onto which the composition has been applied. In particular, the composition never causes contact fault of electric and electronic parts, so that it is useful not only as an insulating material or an adhesive for electric and electronic parts, but also widely used as a sealing agent, a coating agent, a covering agent, a releasing agent to the various kinds of substrates and as a fiber treatment agent. Further, various molded products can be obtained by curing and molding the composition, and the molded products are materials excellent in heat resistance, weather resistance, etc.

EXAMPLES

In the following, the present invention is explained more specifically by referring to Examples and Comparative Examples, but the present invention is not limited by the following Examples. Incidentally, in the following examples, all the "parts" mean "parts by mass", and the viscosity shows the value measured by a rotary viscometer at 25° C. Further, in the following examples, Me represents a methyl group.

Synthetic Example 1

<Synthesis 1 of Dimethylpolysiloxane Compound Having Ethynyl Groups at Both Terminals>

In 500 mL of a four necked separable flask equipped with a mechanical stirrer, a thermometer and a dropping funnel were charged 126 g (425 mmol) of octamethylcyclotetrasiloxane, 13 g (71 mmol) of 1,3-diethynyl-1,1,3,3-tetramethyldisiloxane and 4 g of conc. sulfuric acid ($H_2SO_4$), and the mixture was stirred at room temperature (23° C.) for 3 hours. Thereafter, 2 g of water ($H_2O$) was added to the mixture, the resulting mixture was stirred for 1 hour or longer, 50 mL of toluene was added to the mixture, and after separating the acid to be disposed, the toluene solution was washed with water until the solution became neutral. Toluene and a low molecular weight siloxane were stripped at 150° C./8 mmHg under reduced pressure to obtain Polymer A shown below having a viscosity of 16 mPa·s.

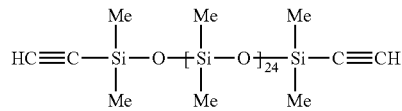

Synthetic Example 2

<Synthesis 2 of Dimethylpolysiloxane Compound Having Ethynyl Groups at Both Terminals>

In 2,000 mL of a four necked separable flask equipped with a mechanical stirrer, a thermometer and a dropping funnel were charged 900 g (3,040 mmol) of octamethylcyclotetrasiloxane, 14 g (77 mmol) of 1,3-diethynyl-1,1,3,3-tetramethyldisiloxane and 45 g of conc. sulfuric acid ($H_2SO_4$), and the mixture was stirred at room temperature (23° C.) for 3 hours. Thereafter, 21 g of water ($H_2O$) was added to the mixture, the resulting mixture was stirred for 1 hour or longer, 250 mL of toluene was added to the mixture, and after separating the acid to be disposed, the toluene solution was washed with water until the solution became neutral. Toluene and a low molecular weight siloxane were stripped at 150° C./8 mmHg under reduced pressure to obtain Polymer B shown below having a viscosity of 370 mPa·s.

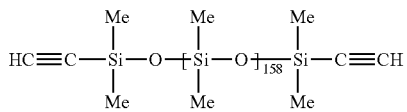

Synthetic Example 3

Synthesis 3 of Dimethylpolysiloxane Compound Having Ethynyl Groups at Both Terminals In 5,000 mL of a four necked separable flask equipped with a mechanical stirrer, a thermometer and a dropping funnel were charged 3,050 g (1,030 mmol) of octamethylcyclotetrasiloxane, 32 g (175 mmol) of 1,3-diethynyl-1,1,3,3-tetramethyldisiloxane and 154 g of conc. sulfuric acid ($H_2SO_4$), and the mixture was stirred at room temperature (23° C.) for 3 hours or longer. Thereafter, 66 g of water ($H_2O$) was added to the mixture, the resulting mixture was stirred for one hour or longer, 500 mL of toluene was added to the mixture, and after separating the acid to be disposed, the toluene solution was washed with water until the solution became neutral. Toluene and a low molecular weight siloxane were stripped at 150° C./8 mmHg under reduced pressure to obtain Polymer C shown below having a viscosity of 935 mPa·s.

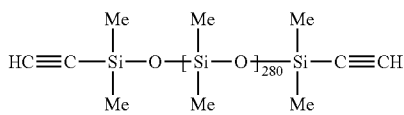

Synthetic Example 4

<Synthesis 4 of Dimethylpolysiloxane Compound Having Ethynyl Groups at Both Terminals>

In 3,000 mL of a four necked separable flask equipped with a mechanical stirrer, a thermometer and a dropping funnel were charged 1,800 g (6,080 mmol) of octamethylcyclotetrasiloxane, 13 g (71 mmol) of 1,3-diethynyl-1,1,3,3-tetramethyldisiloxane and 91 g of conc. sulfuric acid ($H_2SO_4$), and the mixture was stirred at room temperature (23° C.) for 3 hours or longer. Thereafter, 39 g of water ($H_2O$) was added to the mixture, the resulting mixture was stirred for one hour or longer, 500 mL of toluene was added to the mixture, and after separating the acid to be disposed, the toluene solution was washed with water until the solution became neutral. Toluene and a low molecular weight siloxane were stripped at 150° C./8 mmHg under reduced pressure to obtain Polymer D shown below having a viscosity of 1,980 mPa·s.

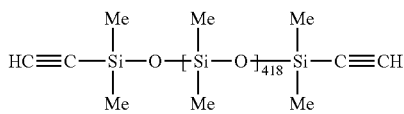

Synthetic Example 5

<Synthesis 5 of Dimethylpolysiloxane Compound Having Ethynyl Groups at Both Terminals>

In 5,000 mL of a four necked separable flask equipped with a mechanical stirrer, a thermometer and a dropping funnel were charged 2,800 g (9,460 mmol) of octamethylcyclotetrasiloxane, 3 g (16 mmol) of 1,3-diethynyl-1,1,3,3-tetramethyldisiloxane and 84 g of conc. sulfuric acid ($H_2SO_4$), and the mixture was stirred at room temperature (23° C.) for 3 hours or longer. Thereafter, 36 g of water ($H_2O$) was added to the mixture, the resulting mixture was 60 stirred for one hour or longer, 1,000 mL of toluene was added to the mixture, and after separating the acid to be disposed, the toluene solution was washed with water until the solution became neutral. Toluene and a low molecular weight siloxane were stripped at 150° C./8 mmHg under reduced pressure to obtain Polymer E shown below having a viscosity of 96,000 mPa·s.

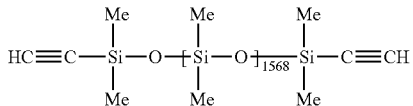

Synthetic Example 6

<Synthesis of Branched Type Dimethylpolysiloxane Compound Having Ethynyl Groups at Terminals>

In 3,000 mL of a four necked separable flask equipped with a mechanical stirrer, a thermometer and a dropping funnel were charged 1,800 g (6,080 mmol) of octamethylcyclotetrasiloxane, 108 g (11 mmol) of a branched type polydimethylsiloxane compound represented by the following formula (5), 75 g (4 mmol) of a polymer represented by the following formula (6) and 26 g (83 mmol) of 1,1,1,3,3,5,5,7,7,7-decamethyltetrasiloxane, and the temperature of the mixture was raised from room temperature to 150° C. To the mixture was added 61 g of conc. sulfuric acid and a polymerization reaction was started. The mixture was stirred at 155 to 165° C. for 6 hours, after returning the temperature of the mixture to room temperature, 500 mL of toluene was added to the mixture, and after separating the acid to be disposed, the toluene solution was washed with water until the solution became neutral. Toluene and a low molecular weight siloxane were stripped at 150° C./8 mmHg under reduced pressure to obtain Polymer F represented by the following formula (7) having a viscosity of 1,200 mPa·s.

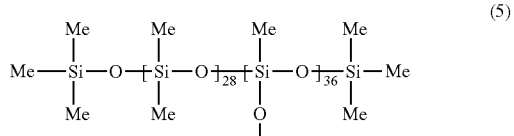

(5)

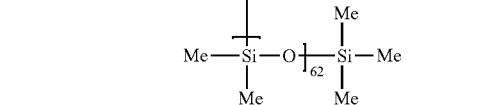

(6)

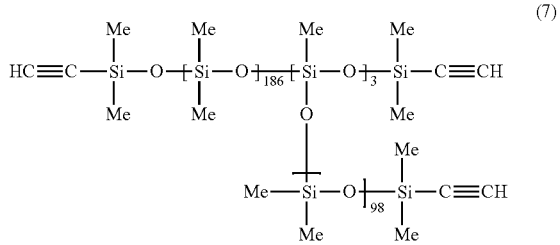

(7)

Comparative Synthetic Example 1

<Synthesis of Dimethylpolysiloxane Compound Having Ethynyl Groups at Terminals>

In 5,000 mL of a four necked separable flask equipped with a mechanical stirrer, a thermometer and a dropping funnel were charged 3,050 g (10 mol) of octamethylcyclotetrasiloxane, 32 g (175 mmol) of 1,3-diethynyl-1,1,3,3- tetramethyldisiloxane and 0.056 g (1 mmol) of potassium hydroxide (KOH), and the mixture was stirred at room temperature (23° C.) for 3 hours or longer. To the mixture was added 0.41 g (5 mmol) of ethylene chlorohydrin (ECH), the resulting mixture was stirred for one hour or longer, and after neutralization, the mixture was stripped at 150° C./8 mmHg under reduced pressure, but a polymer component could not be obtained as a product.

<Synthesis of Dimethylpolysiloxane Compound Both Terminals of which have been Blocked by Trimethoxysilyl-Ethylene Groups>

In 5,000 mL of a four necked separable flask equipped with a mechanical stirrer, a thermometer and a dropping funnel were charged 1,000 g of Polymer C obtained in Synthetic Example 3, 6.4 g of trimethoxysilane and 0.5 g of chloroplatinic acid ($H_2PtCl_6 \cdot 6H_2O$), and the mixture was stirred at 70° C. for 3 hours. Thereafter, the mixture was stripped at 120° C./20 mmHg under reduced pressure to obtain Polymer C' shown below having a viscosity of 970 mPa·s.

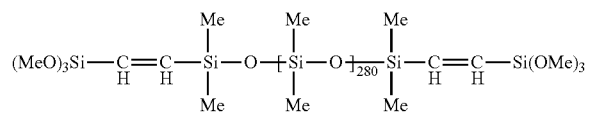

Example 1

100 parts of dimethylpolysiloxane (Polymer C') both terminals of a molecular chain of which have been blocked by trimethoxysilyl-ethylene groups and having a viscosity of 970 mPa·s, and 0.1 part of titanium tetraisopropoxide were mixed until the mixture became uniform under shielding moisture to prepare a composition.

Example 2

100 parts of dimethylpolysiloxane (Polymer C') both terminals of a molecular chain of which have been blocked by trimethoxysilyl-ethylene groups and having a viscosity of 970 mPa·s, and 0.2 part of titanium tetra-2-ethyl-hexoxide were mixed until the mixture became uniform under shielding moisture to prepare a composition.

Example 3

100 parts of dimethylpolysiloxane (Polymer C') both terminals of a molecular chain of which have been blocked by trimethoxysilyl-ethylene groups and having a viscosity of 970 mPa·s, and 0.1 part of titanium diisopropoxybis-(ethylacetoacetate) were mixed until the mixture became uniform under shielding moisture to prepare a composition.

Example 4

100 parts of dimethylpolysiloxane (Polymer C') both terminals of a molecular chain of which have been blocked by trimethoxysilyl-ethylene groups and having a viscosity of 970 mPa·s, and 0.5 part of dioctyl tin dilaurate were mixed until the mixture became uniform under shielding moisture to prepare a composition.

Example 5

100 parts of dimethylpolysiloxane (Polymer C') both terminals of a molecular chain of which have been blocked by trimethoxysilyl-ethylene groups and having a viscosity of 970 mPa·s, and 1 part of diazabicycloundecene were mixed until the mixture became uniform under shielding moisture to prepare a composition.

Comparative Examples 1 to 5

The compositions were prepared in the same manner as in Examples 1 to 5 except for using 100 parts of dimethylpolysiloxane in which the terminals of the molecular chain have been blocked by trimethoxysilyl-ethane groups in place of 100 parts of the dimethylpolysiloxane in which both terminals of the molecular chain have been blocked by the trimethoxysilyl-ethylene groups.

Comparative Examples 6 to 10

The compositions were prepared in the same manner as in Examples 1 to 5 except for using 100 parts of dimethylpolysiloxane in which the terminals of the molecular chain have been blocked by trimethoxysiloxy groups in place of 100 parts of the dimethylpolysiloxane in which both terminals of the molecular chain have been blocked by the trimethoxysilyl-ethylene groups.

Thereafter, tack free times of the respective compositions prepared in Examples 1 to 5 and Comparative Examples 1 to 10 were measured.

In addition, the respective compositions immediately after preparation which were prepared in Example 4 and Comparative Examples 4 and 9 were each extruded to a sheet state with a thickness of 2 mm, exposed to air at 23° C. and 50% RH, then, the each sheet was allowed to stand under the same atmosphere for 7 days to obtain a cured product. Physical property (initial physical property) of the cured product was measured in accordance with JIS K-6249. Incidentally, the hardness was measured by using a durometer A hardness meter according to JIS K-6249.

Further, the cured product was stored in a thermo-hygrostat at 85° C. and 85% RH for 100 hours and the hardness was similarly measured. Moreover, the same measurements were carried out with regard to the sheets each having a thickness of 2 mm which had been prepared from the respective compositions immediately after preparation which were prepared in Example 4 and Comparative Examples 4 and 9 each charged in a sealed vessel and allowed to stand at a temperature of 70° C. for 7 days.

These results are shown in Tables 1 and 2.

TABLE 1

|  | Example 1 | Example 2 | Example 3 | Example 4 | Example 5 |
|---|---|---|---|---|---|
| Tack free time | 6 | 6 | 3 | 8 | 3 |

|  | Comparative example 1 | Comparative example 2 | Comparative example 3 | Comparative example 4 | Comparative example 5 |
|---|---|---|---|---|---|
| Tack free time | 240 | 120 | 60 | 300 | 360 or more |

|  | Comparative example 6 | Comparative example 7 | Comparative example 8 | Comparative example 9 | Comparative example 10 |
|---|---|---|---|---|---|
| Tack free time | 210 | 150 | 120 | 240 | 60 |

TABLE 2

|  |  | Example 4 | Comparative example 4 | Comparative example 9 |
|---|---|---|---|---|
| Initial | Hardness (Durometer A) | 26 | 18 | 29 |
|  | Elongation (%) at breakage | 90 | 85 | 105 |
|  | Tensile strength (MPa) | 0.36 | 0.23 | 0.46 |
| Durability test 85° C., 85% RH | Hardness (Durometer A) | 27 | 31 | 18 |
|  | Elongation (%) at breakage | 95 | 90 | 140 |
|  | Tensile strength (MPa) | 0.38 | 0.44 | 0.41 |

TABLE 2-continued

|  |  | Example 4 | Comparative example 4 | Comparative example 9 |
|---|---|---|---|---|
| Storage test 70° C., 7 days | Hardness (Durometer A) | 26 | 12 | 30 |
|  | Elongation (%) at breakage | 90 | 165 | 90 |
|  | Tensile strength (MPa) | 0.36 | 0.24 | 0.43 |

Example 6

100 parts of the dimethylpolysiloxane (Polymer C') both terminals of a molecular chain of which have been blocked by trimethoxysilyl-ethylene groups and having a viscosity of 970 mPa·s, and 10 parts of fumed silica the surface of which had been treated by dimethyldichiorosilane were uniformly mixed, then, 5 parts of methyltrimethoxysilane, 0.3 part of dibutyltin dilaurate and 1 part of 3-aminopropyltriethoxysilane were added to the mixture, and the resulting mixture was mixed until it became uniform under shielding moisture to prepare a composition.

Comparative Example 11

The composition was prepared in the same manner as in Example 6, except for using 100 parts of dimethylpolysiloxane in which the terminals of the molecular chain have been blocked by trimethoxysilyl-ethane groups and having a viscosity of 1,000 mPa·s in place of 100 parts of the dimethylpolysiloxane in which both terminals of the molecular chain have been blocked by the trimethoxysilyl-ethylene groups.

Comparative Example 12

The composition was prepared in the same manner as in Example 6, except for using 100 parts of dimethylpolysiloxane in which the terminals of the molecular chain have been blocked by trimethoxysiloxy groups and having a viscosity of 1,050 mPa·s in place of 100 parts of the dimethylpolysiloxane in which both terminals of the molecular chain have been blocked by the trimethoxysilyl-ethylene groups.

Comparative Example 13

The composition was prepared in the same manner as in Example 6, except for using 100 parts of dimethylpolysiloxane having a viscosity of 1,080 mPa·s and represented by the following formula in place of 100 parts of the dimethylpolysiloxane in which both terminals of the molecular chain have been blocked by the trimethoxysilyl-ethylene groups.

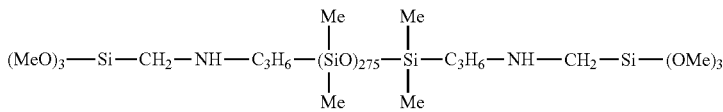

Next, the respective compositions immediately after preparation which were prepared in Example 6 and Comparative Examples 11 to 13 were each extruded to a sheet state with a thickness of 2 mm, exposed to air at 23° C. and 50% RH, then, the each sheet was allowed to stand under the same atmosphere for 7 days to obtain a cured product. Physical property (initial physical property) of the cured product was measured in accordance with JIS K-6249. Incidentally, the hardness was measured by using a durometer A hardness meter according to JIS K-6249.

Further, the cured product was stored in a thermo-hygrostat at 85° C. and 85% RH for 240 hours and the hardness was similarly measured. Moreover, the cured product was heated in an oven at 150° C. for 240 hours and measured in the same manner as mentioned above. Furthermore, the same measurements were carried out with regard to the sheets each having a thickness of 2 mm which had been prepared from the respective compositions immediately after preparation which were prepared in Example 6 and Comparative Examples 11 to 13 each charged in a sealed vessel and allowed to stand at a temperature of 70° C. for 7 days.

These results were shown in Table 3.

TABLE 3

|  |  | Example 6 | Comparative example 11 | Comparative example 12 | Comparative example 13 |
|---|---|---|---|---|---|
| Initial | Hardness (Durometer A) | 35 | 33 | 34 | 35 |
|  | Elongation (%) at breakage | 150 | 140 | 160 | 180 |
|  | Tensile strength (MPa) | 1.4 | 1.3 | 1.4 | 1.3 |

TABLE 3-continued

| | | Example 6 | Comparative example 11 | Comparative example 12 | Comparative example 13 |
|---|---|---|---|---|---|
| Durability test 85° C., 85% RH | Hardness (Durometer A) | 35 | 30 | 18 | 15 |
| | Elongation (%) at breakage | 160 | 150 | 180 | 350 |
| | Tensile strength (MPa) | 1.4 | 1.3 | 0.9 | 0.6 |
| Heat resistant test 150° C. | Hardness (Durometer A) | 34 | 25 | 28 | 42 |
| | Elongation (%) at breakage | 170 | 210 | 260 | 120 |
| | Tensile strength (MPa) | 1.5 | 1.2 | 0.9 | 1.4 |
| Storage test 70° C., 7 days | Hardness (Durometer A) | 36 | 20 | 33 | 21 |
| | Elongation (%) at breakage | 150 | 200 | 120 | 220 |
| | Tensile strength (MPa) | 1.5 | 1.0 | 0.9 | 0.8 |

From the results shown in Table 1, it would be clear that Examples 1 to 5 are extremely high in rapid curability as compared to those of the corresponding Comparative Examples 1 to 10, respectively. Also, from the results shown in Table 2, it would be clear that Example 4 is markedly high in storage stability and durability as compared to those of Comparative Examples 4 and 9, and from the results shown in Table 3, it would be clear that Example 6 is markedly high in storage stability, heat resistance and durability as compared to those of Comparative Examples 11 to 13.

It must be stated here that the present invention is not restricted to the embodiments shown by the embodiments. The embodiments are merely examples so that any embodiments composed of substantially the same technical concept as disclosed in the claims of the present invention and expressing a similar effect are included in the technical scope of the present invention.

The invention claimed is:

1. A method for preparing an organosiloxane polymer having an alkoxysilyl-ethylene group at its terminal which comprises subjecting an organopolysiloxane compound which is either a linear or a branched, and having at least one unit of the following formula (1') as a partial structure and an alkoxysilane to addition reaction according to the following reaction formula, to prepare an organosiloxane polymer which is either a linear or a branched, and having an alkoxysilyl-ethylene group at its terminal having at least one unit of the following formula (1'') in a molecule,

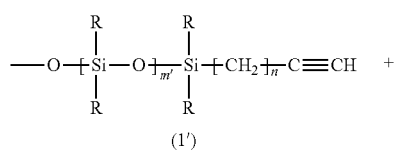

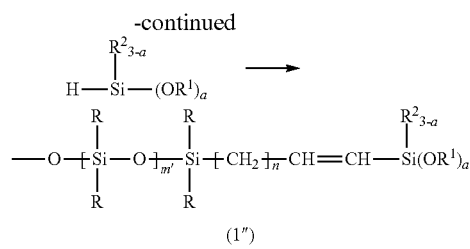

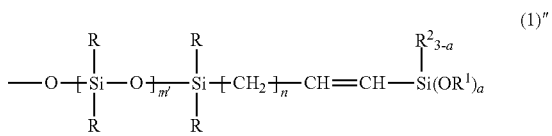

(1'')

wherein R represents a hydrogen atom or a monovalent hydrocarbon group having 1 to 20 carbon atoms which may have a substituent; each R may be the same or different from each other; "m'" represents an integer of 0 to 2,000, parts of a repeating unit of the siloxane bond may be crosslinked to form a branched chain structure; "n" represents an integer of 0 to 20; $R^1$ represents an alkyl group having 1 to 20 carbon atoms which may have a substituent, and those having 3 or more carbon atoms among the alkyl groups may be a cycloalkyl group which is cyclic; $R^2$ represents a hydrogen atom or a monovalent hydrocarbon group having 1 to 20 carbon atoms which may have a substituent; and "a" represents an integer of 1 to 3.

2. A room temperature curable composition which comprises
   (A) 100 parts by mass of an organosiloxane polymer which is either a linear or a branched, and having an alkoxysilyl-ethylene group at its terminal having at least one unit of the following formula (1'') in a molecule, $$\underset{(1'')}{\overline{\phantom{xxx}}O\!\!\left[\!\!\begin{array}{c}R\\|\\Si\\|\\R\end{array}\!\!-O\right]_{\!\!m'}\!\!\begin{array}{c}R\\|\\Si\\|\\R\end{array}\!\!\left[CH_2\right]_{\!\!n}\!\!-CH\!=\!CH\!-\!Si(OR^1)_a^{R^2_{3-a}}}$$

wherein R represents a hydrogen atom or a monovalent hydrocarbon group having 1 to 20 carbon atoms which may have a substituent; each R may be the same or different from each other; "m" represents an integer of 0 to 2,000, parts of a repeating unit of the siloxane bond may be crosslinked to form a branched chain structure; "n" represents an integer of 0 to 20; $R^1$ represents an alkyl group having 1 to 20 carbon atoms which may have a substituent, and those having 3 or more carbon atoms among the alkyl groups may be a cycloalkyl group which is cyclic; $R^2$ represents a hydrogen atom or a monovalent hydrocarbon group having 1 to 20 carbon atoms which may have a substituent; and "a" represents an integer of 1 to 3,
   (B) 0.001 to 15 parts by mass of a curing catalyst,
   (C) 0 to 30 parts by mass of a silane compound and/or a partial hydrolysis condensate thereof,
   (D) 0 to 1,000 parts by mass of a filler, and
   (E) 0 to 30 parts by mass of an adhesion promoter.

3. The room temperature curable composition according to claim 2, wherein a main chain of the Component (A) in the room temperature curable composition is an organopolysiloxane.

4. The room temperature curable composition according to claim 3, wherein the room temperature curable composition is used as either of a sealing agent, a coating agent or an adhesive.

5. A molded product comprising a cured product of the room temperature curable composition according to claim 3.

6. The room temperature curable composition according to claim 2, wherein the room temperature curable composition is used as either of a sealing agent, a coating agent or an adhesive.

7. A molded product comprising a cured product of the room temperature curable composition according to claim 2.

8. The room temperature curable composition according to claim 2, wherein "m" represents an integer of 21 to 1,600 in the formula (1").

9. The room temperature curable composition according to claim 2, wherein "m" represents an integer of 22 to 1,000 in the formula (1").

10. The room temperature curable composition according to claim 2, wherein "m" represents an integer of 24 to 500 in the formula (1").

11. The room temperature curable composition according to claim 2, wherein the organosiloxane polymer having an alkoxysilyl-ethylene group at its terminal of the Component (A) is a linear chain diorganopolysiloxane having 2 units of the following formula (1a),

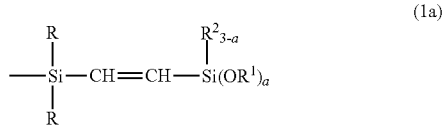
(1a)

wherein R, $R^1$, $R^2$ and "a" have the same meanings as defined above.

12. The room temperature curable composition according to claim 2, wherein the organosiloxane polymer having an alkoxysilyl-ethylene group at its terminal of the Component (A) is represented by the following formulae (2a) or (3a),

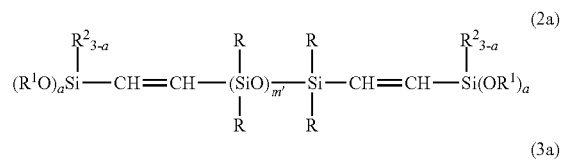
(2a)

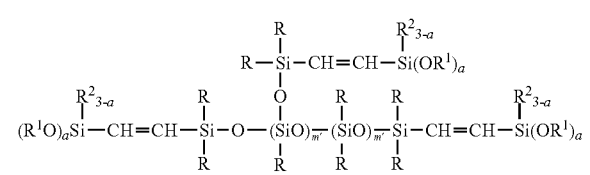
(3a)

wherein R, $R^1$, $R^2$, "a" and "m" have the same meanings as defined above, "m" represents an integer of 1 to 100, and m'+m" is a number which makes the viscosity of the diorganopolysiloxane at 25° C. of 10 to 1,000,000 mPa·s.

13. The room temperature curable composition according to claim 2, wherein the curing catalyst of the Component (B) is an organometallic catalyst.

* * * * *